Jan. 23, 1945.　　F. W. GUIBERT ET AL　　2,368,019
LIQUID TRANSMISSION DEVICE
Filed Oct. 13, 1941　　2 Sheets-Sheet 1

INVENTORS
Francis W. Guibert
Frederic B. Fuller
BY John Flam
ATTORNEY

Jan. 23, 1945.   F. W. GUIBERT ET AL   2,368,019
LIQUID TRANSMISSION DEVICE
Filed Oct. 13, 1941   2 Sheets-Sheet 2
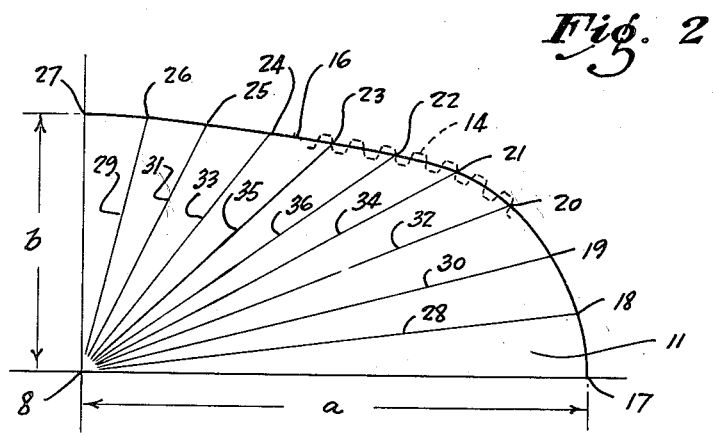
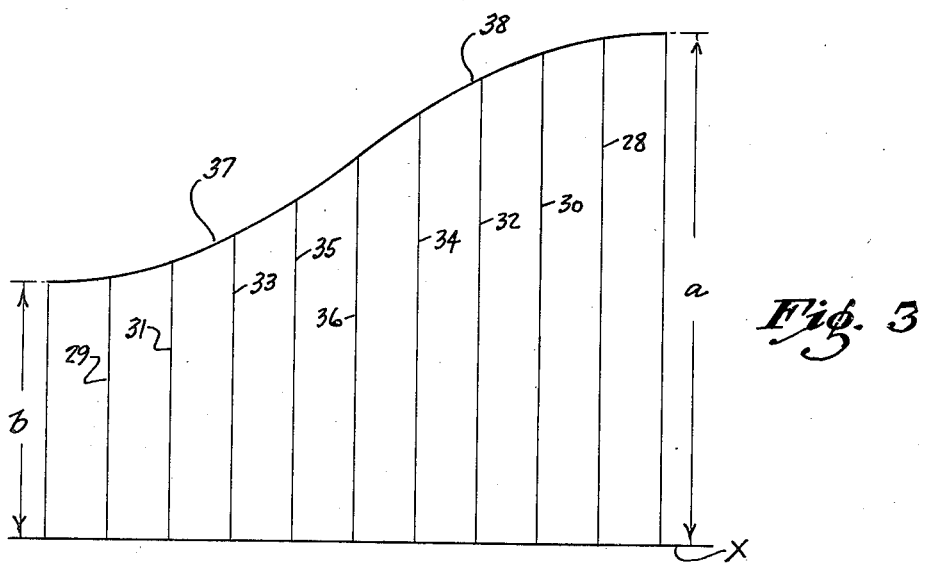
INVENTORS
Francis W. Guibert
Frederic B. Fuller
BY John Flam
ATTORNEY Patented Jan. 23, 1945

2,368,019

UNITED STATES PATENT OFFICE 2,368,019

LIQUID TRANSMISSION DEVICE

Francis W. Guibert, Los Angeles, and Frederic B. Fuller, Whittier, Calif.; said Fuller assignor to said Guibert Application October 13, 1941, Serial No. 414,704

6 Claims. (Cl. 103—126)

This invention relates to a liquid flow device, capable of being driven by flow of liquid, as for measurement of the flow, or of operating as a pump upon a liquid.

Liquid flow meters of various types have been devised. In one form, a casing is provided having two rotors of general elliptical form, rotatable about their geometric centers and having intermeshing teeth. The casing has an inlet and an outlet, and its walls are of circular cylindrical form, capable of being in sealing contact with the rotors at the points of maximum radius of the rotors in the course of rotation thereof. In this way, liquid is periodically permitted to enter into the spaces between the rotors and the casing walls; the liquid is subsequently trapped and later discharged as the rotors continue their angular movement.

It is readily demonstrable that if the rotors have pitch lines conforming exactly to true ellipses, then the pitch lines do not continue to touch each other throughout a complete revolution; instead, they are separated at places corresponding to a portion of the pitch arc intermediate the major and minor axes. It is possible to modify the form of the elliptic lobes to overcome this discrepancy; but further considerations readily show that a random mode of compensation is not satisfactory.

In arriving at a satisfactory solution, certain conditions of operation of the metering function must be considered. The liquid being measured is to flow out of the meter with as little pulsation as possible. It may be assumed that the liquid prior to the time it reaches the meter has a substantially steady flow. Obviously, if one of the two rotors be driven at a uniform angular rate, the rate of rotation of the other rotor cyclically varies from a minimum to a maximum throughout each quarter revolution. This is a necessary result of the fact that the radius of the driving rotor drawn to the places of meshing, varies as the rotor progresses. Under such circumstances the delivery of liquid past both rotors would be unsatisfactorily pulsating.

It is one of the objects of this invention to make it possible to reduce these pulsations to zero; and particularly by so designing the rotor lobes that one rotor is caused to have an angular motion that cyclically accelerates and decelerates, while the other rotor correspondingly has an angular motion that conversely decelerates and accelerates. The rates of acceleration of one rotor and deceleration of the other at any instant are equal. As a necessary requirement to accomplish this, the rate of arc traverse along the pitch lines is uniform, that is, the linear velocity along the arc of the pitch line, is constant.

By fulfilling these requirements with elliptic bilobar rotors that are intermeshed by teeth carried on the rotor peripheries, smooth operation is effected and corresponding great accuracy of measurement. Due to the relation between the angular accelerations and decelerations of the two rotors, the sum of the deliveries of liquid past the rotors remains constant, for as the delivery of one increases that of the other decreases by like amount. There is no danger of any relative slippage between the rotors, since the gear teeth may be formed as accurately as desired.

It is another object of this invention to provide smoothly operating interconnected rotors for liquid metering; and especially by ensuring that the velocity head of liquid will not materially tend to retard the normal speed of the rotors.

In the event that bilobar rotors of this character are used for pumping, there are still other considerations involved. The motive power for such pumps almost invariably has a constant speed, or approximately a constant speed, such as alternating current motors or the like. If such a source of power be directly coupled to drive one of the rotors at constant speed, then obviously the other rotor rotates at a non-uniform speed, the maximum occurring when the major axis of the driving rotor is in line with the minor axis of the driven rotor; and the minimum occurring when the minor axis of the driving rotor is in line with the major axis of the driven rotor. Under such circumstances, while one rotor has uniform angular speed, the other has a cyclically variable or pulsating angular speed, resulting obviously in serious pulsatory discharge.

It is accordingly another object of this invention to eliminate this discharge pulsatory effect, by ensuring that both the driving and driven rotors will have equal pulsatory speeds, the pulsations being in opposite directions. Accordingly a compensating effect is secured, and a resultant liquid delivery that is completely pulseless.

This invention possesses many other advantages, and as other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 2 is an enlarged view of a quadrant of the bilobar rotor utilized in connection with the invention;

Fig. 3 is a curve explaining the manner in which the configuration of the rotor may be obtained.

Figure 1:
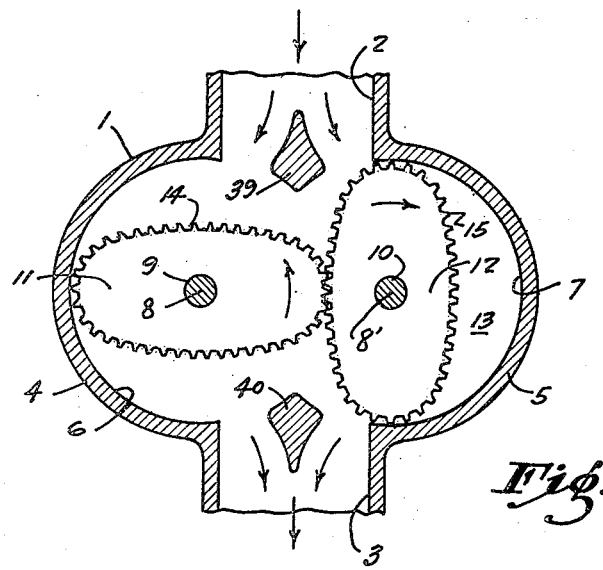
Figure 1 is a longitudinal sectional view of a liquid meter embodying the invention.

In Figure 1 a casing 1 is illustrated, having in this instance an inlet passageway 2 and an outlet passageway 3. Between these two passageways are the walls 4 and 5 forming internal cylindrical surfaces 6 and 7 respectively. These cylindrical surfaces are respectively concentric with axes 8 and 8'.

These two axes 8 and 8' are in parallel relation and each of them provide axes of revolution for the shafts 9 and 10. Furthermore, these axes 8 and 8' are respectively located at the axes of symmetry of the bilobar identical or similar rotors 11 and 12. These rotors are mounted securely upon the respective shafts 9 and 10 and are so arranged as to be in liquid sealing contact with the cylindrical surfaces 6 and 7 as well as with each other at the place or point where these rotors are in contact.

The rotors are of general elliptical shape; but they depart from true elliptic configuration in a manner to be hereinafter described. Considering the particular position of the rotors illustrated in Fig. 1, the major axis of the rotor 11 is at this instant in line with the minor axis of the rotor 12. The flow of liquid through inlet passageway 2 exerts a torque upon the rotor 12 in a clockwise direction. At the particular instant shown, the major axis of one rotor 11 being alined with the minor axis of the other rotor 12, the ratio of the angular velocity of rotor 12 to the angular velocity of rotor 11 is equal to N, where N is the ratio of the length of the major axis to the length of the minor axis of either rotor. After a 90° revolution of the rotors from the position shown in Fig. 1, this ratio of angular velocities is equal to 1/N.

In the process of rotation, the liquid entering through the inlet passageway 2, is subsequently trapped in a space between each rotor and the corresponding cylindrical surface 6 or 7. At the position shown in Fig. 1, such liquid is trapped in the space 13 between the right hand side of rotor 12 and the cylindrical surface 7. This liquid is subsequently discharged through the outlet passage 3 upon a further rotation of the rotor 12. A corresponding amount of liquid is also discharged in one-half revolution of the other rotor 11, corresponding to the liquid trapped between the cylindrical wall 6 of the casing 1 and the left hand side of rotor 11. Accordingly for each revolution of the rotors 11 and 12, the quantity of liquid discharged through the outlet passageway 3 is approximately equal to four times the amount trapped in the space 13.

The amount of liquid delivered is accordingly quite large in comparison with the size of the casing 1. However, unless special precautions are taken, the liquid delivery proceeds in pulsations, interfering with the accuracy of the instrument and otherwise creating undesirable disturbances.

By the aid of the present invention a pulseless flow can be obtained.

As a first requirement, it is necessary so to design the rotors 11 and 12 that they are maintained in rolling contact with each other, without relative slippage. Accordingly it is possible then to form gear teeth 14 and 15 upon the peripheries of these rotors so that they may be in continual meshing relationship with each other. It has been found (and it can be verified by actual lay-outs) that if the rotors 11 and 12 are true ellipses, the pitch lines of the gear teeth do not touch throughout a quarter revolution; they touch only at four equidistant points on each rotor. At intermediate positions the pitch lines do not touch, and accordingly the teeth mesh very badly or fall out of mesh entirely. It is possible to design by a "trial and error" method in an indefinite number of different ways so as to maintain the rotors intermeshed; but such an undefined solution does not ensure against pulsatory discharge.

In order to assure that the discharge will be free of pulsations, it is necessary that the sum of the speeds of the two rotors be constant for all positions of the cycle of rotation. In other words, the amount of fluid or liquid passing around rotor 11 per unit of time may be reduced by any amount, provided that for the same unit of time the amount of liquid passing around the other rotor 12 is increased by exactly the same amount. There will then be no resulting fluctuation in the discharge or intake rate.

The manner in which this important relationship is obtained by appropriate configuration of the pitch line of the rotors 11 and 12 may be explained by reference to Figs. 2 and 3.

In Fig. 2, the pitch line 16 of the upper right hand quadrant of the rotor 11 is illustrated. The effective major axis in this case is assumed to be 2a. Accordingly half the major axis a is indicated by appropriate dimension. Similarly, half the minor axis is given by the dimension b in that figure.

The pitch line 16 may be considered to be divided into any large number of equal arc lengths corresponding to unit arc lengths. Thus, for example, the quadrant of the pitch line 16 shown has been arbitrarily divided into ten arc length units defined by the points 17 to 27 inclusive. In an actual layout, the arc length units may be made very much shorter. The radius of the rotor between the axis 8 and the point 17 corresponds to a, half the major axis. Similarly the radius of the rotor from the axis 8 to the point 27 corresponds to b, half the minor axis.

Now let us consider the radius 28 extending from the axis 8 to the point 18. When the rotor 11 is in such position that the radius 28 is the one which is in alinement with the line joining the axes 8 and 8' of Fig. 1, the rotor 12 will have moved to such a position that it has rolled on the arc length 17–18 on the rotor 11; rotor 12 having progressed by an equal arc length. Accordingly the radius of rotor 12 in alinement with radius 28 corresponds to the radius 29 of Fig. 2. This radius extends from the axis 8 to the point 26, the length of the arc 26–27 corresponding to the length of the arc that corresponds to the rolling of rotor 12 on the length of the arc 17–18 of rotor 11.

Accordingly, the sum of the lengths of the radii 28 and 29 must equal the distance between the axes 8' and 8; and this in turn equals $a+b$.

Similarly, for this rolling relation to hold true, the sum of the length of the radius 30 and the length of the radius 31 must also equal the same amount, $a+b$. By the same reasoning the sum of the lengths of the radii 32 and 33 must also equal this same amount; and the same holds true of the sum of the lengths of the radii 34 and 35. The radius 36 extending to the point 22 (corresponding to the midpoint of the length of the pitch line 16) must equal half the amount $a+b$.

Thus far we have considered only the requirement that the rotors should remain in intermeshed relationship throughout their entire period of rotation. It is an additional requirement as heretofore stated that the acceleration of angular motion of one rotor should be equal to the deceleration of the angular motion of the other rotor at any instant. In this way as the rotors revolve, the acceleration of motion of rotor 11 as illustrated in Fig. 1 must be matched at all times by the deceleration of the rotor 12. This acceleration continues until there is a rotation of 90° from the position of Fig. 1. Thereafter there is a deceleration in the velocity of rotor 11, and a corresponding acceleration in the velocity of rotor 12.

This requirement is graphically illustrated in Fig. 3. If we plot the length of radii 28 to 36 inclusive as ordinates of a curve, and if these ordinates are equally spaced along the X axis, then the curves 37 and 38 joining the ends of these ordinates must be true parabolas. These two parabolas form inverted curves smoothly joining at the extremity of the central radius 36. As is well known, the points on the parabola fall on a curve such that its second derivative is a constant. This second derivative then corresponds to a constant acceleration or deceleration.

The actual configuration of the pitch line curve 16 can then be obtained by trial and error. The parabolas 37 and 38 are first plotted, since the lengths $a$ and $b$ are known and the length 36 is known, being equal to half the quantity $a+b$. Knowing these points on the two parabolas, these parabolas 37 and 38 may be plotted. Then by trial and error the configuration of the arc 16 can be proceeded with and it may be made as accurate as desired by repeated trials. As the first step of this trial and error method, points 27 and 17 may be determined on the rotor 11, corresponding to the minor and major axes, as shown in Fig. 2. Then a trial may be made, locating point 18; this location is such that it corresponds to the best guess: thus, the distance between points 17 and 18 will be one-tenth of the entire length of the curve between points 17 and 27. A close approximation, at least, is possible by taking that distance 17–18 as one-tenth of the quarter periphery of a true elipse having a major axis of $a$ and a minor axis of $b$. Then the point 18 is further determined by making the distance from point 8 to 18 equal to the line 28 on the curve of Fig. 3. Point 19 is similarly laid out, the distance between points 18 and 19 being equal to the distance between points 17 and 18, and the radius 30 being made equal in length to the line 30 of Fig. 3. If the guess at the length of the curve increments 17–18, 18–29, etc. is intolerably incorrect, then a new length for each increment 17–18, etc. is tried in order to make ten of these increment lengths fall exactly between points 17 and 27. In this way several trials of curve length increments may be necessary in order to form a smooth, continuous line between the extreme points 17 and 27. Absolute accuracy of course is not essential.

The final form, then, is such that, where equal curve lengths 17–18, 18–19, etc. are laid off on the pitch line 16, and the radii 8–17, 8–18, etc. are drawn, then the radii obey the parabolic law as shown by the curves 37, 38, in Fig. 3.

When all of these conditions are fulfilled, the kinetic energy built up in one rotor, due to the inertia of that rotor during its period of acceleration, is just sufficient to accelerate the other rotor when its period of deceleration ends. Of course both rotors for this purpose should be as uniformly matched as is practicable.

In order further to assist in eliminating pulsations, divider baffles 39 and 40 are placed respectively in the inlet passageway 2 and the outlet passageway 3. These baffles are placed as close as possible to the line of gear centers between the axes 8 and 8'. The baffle 39 on the intake side prevents the velocity head of the intake flow from impinging directly on the rotors 11 and 12 at their point of contact. Such impingement would tend to retard their motion, since at this point their motion is directly opposite to the flow of the liquid. Similarly, on the outlet side the velocity head of the outlet flow of liquid would tend to create an area of reduced back pressure at the point of contact on the outlet side. The baffle 40 here reduces this tendency which would again retard the motion of the rotors for the same reason.

The rotation of either of the shafts 9 or 10 can be utilized to operate an indicating mechanism. This mechanism may be constructed in such a manner as not to place any appreciable load upon the rotation of the rotors.

Figure 4:
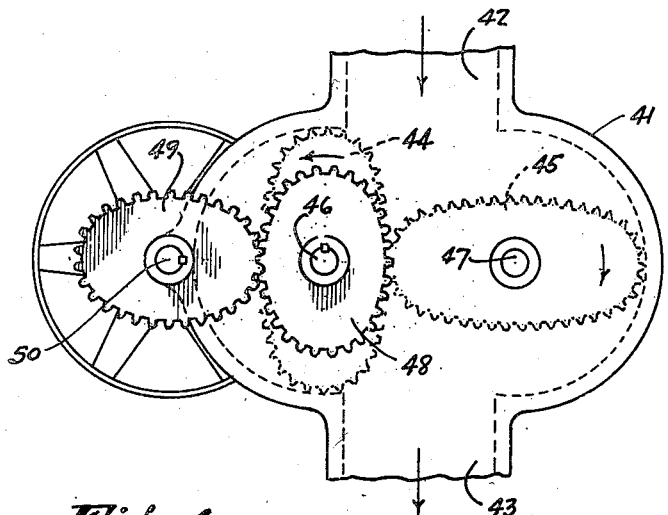
Fig. 4 is an elevation of a pump utilizing the invention.

If the device is to be used as a gear pump, further considerations are necessary. Such a form of deivce is illustrated in Fig. 4. In this case the housing or casing 41 is shown as provided with the inlet passageway 42 and the outlet passageway 43. The rotors 44 and 45 are shown as in geared relationship within the casing 41 and mounted upon shafts 46 and 47.

If either of the two shafts 46 or 47 be rotated by any conventional source of motion, serious pulsations in the delivery would result; this occurs because such conventional sources of motion usually operate at substantially constant speed. Accordingly if either of the two shafts 46 or 47 is rotated at constant speed, serious pulsations in the speed of the other rotor must occur.

Thus if the ratio of the major to the minor axis of either of the two rotors 44 and 45 be designated as N, and if we assume that rotor 44 is the driving rotor, then obviously the ratio of transmission (or the ratio of the speed of rotor 45 with respect to the speed of rotor 44) at the instant shown is given by the amount $1/N$. This corresponds to the minimum speed of rotor 45. The maximum speed occurs when the major axis of rotor 44 is in alinement with the minor axis of rotor 45. In that event the ratio of speeds of rotor 45 to rotor 44 is equal to N. Accordingly the ratio of the maximum to the minimum speed of rotor 45 would be $N^2$. Ordinarily, for satisfactory purposes, the ratio N of the major to the minor axes is chosen as neighboring the value 2. Accordingly the fluctuations in the speed of the driven rotor, if the driving rotor is driven at a uniform speed, would be such that the driven rotor would be driven four times as fast at the maximum speed as compared with its minimum speed.

In order to make it possible to equalize the fluctuations in angular velocity between the two rotors and therefore provide substantially pulseless operation, the angular velocity of the driven shaft 46 is caused to vary in such a way that the ratio of the maximum to the minimum speed is equal to $\sqrt{N}$. The maximum speed of rotor 44 should occur at the instant shown in Fig. 4. This maximum angular speed is $\sqrt{N}$ times the minimum speed of rotor 44 when its major axis is in alinement with the minor axis of rotor 45. If this condition is fulfilled it can readily be proved that the corresponding ratio of maximum to minimum speed of the driven rotor 45 is also equal to the $\sqrt{N}$; and there is a resultant substantially complete elimination in the pulsations of the liquid delivery.

In order to obtain this variation in speed of shaft 46 use is made in this instance of a pair of bilobar driving gears 48 and 49. These gears are identical. Gear 48 is mounted on its axis of symmetry on shaft 46. The gear 49 is mounted similarly on a shaft 50 which may be driven at a constant speed from any conventional source of motion. These gears 48 and 49 may conveniently be placed exterior of the casing 41. The major axis of gear 48 coincides in angular position with the major axis of rotor 44, and similarly the major axis of the driving gear 49 is in alinement with the minor axis of the driven gear 48. In order to obtain the required variations in speed of shaft 46, the ratio of the major axis to the minor axis of each of the gears 48 and 49 is made equal to $\sqrt{N}$. Simple mathematics will then show that the proper speed variations are secured in connection with the rotation of the shaft 46.

The bilobar elements 44, 45, 48 and 49 may be designed in accordance with the requirements set forth in connection with the rotors 11 and 12 of the form shown in Fig. 1.

What is claimed is:

1. A liquid transmission device having a casing in which there is an inlet opening and an outlet opening, as well as a pair of similar bilobar rotors in the casing, each rotor having mutually perpendicular major and minor axes, and arranged to rotate in opposite directions about respective axes of symmetry that are parallel to each other, said rotors being in continuous sealing contact with each other, and also in sealing contact with the walls of the casing, said rotors having effective radii defining by their extremities the arcuate configuration of the bilobes, said radii substantially obeying the following rule: when the arcuate configuration is divided into an integral number of equal arc lengths between the extremity of the major axis and the extremity of the minor axis, then the radii extending to the division points between the equal arc lengths, when used as ordinates uniformly spaced, have their extremities falling on a curve formed of two equal paraboli, one inverted with respect to the other, the end ordinates corresponding respectively to the major and minor axes, and the centrally located ordinate having a length corresponding to the mean between the end ordinates, the extremity of said centrally located ordinate falling on that point where the paraboli meet, and the sums of the lengths of those ordinates that are equally spaced from the end ordinates being a constant and equal to the sum of the major and minor axes.

2. A liquid transmission device having a casing in which there is an inlet opening and an outlet opening, as well as a pair of similar bilobar rotors in the casing, each rotor having mutually perpendicular major and minor axes, and having intermeshing teeth so that they rotate in opposite directions about respective axes of symmetry that are parallel to each other, said rotors being in continuous sealing contact with each other, and also in sealing contact with the walls of the casing, said rotors having effective radii defined by the arcuate pitch line of the intermeshing teeth, and substantially obeying the following rule: when the arcuate pitch line is divided into an integral number of equal arc lengths between the extremity of the major axis and the extremity of the minor axis, then the radii extending to the division points between the equal arc lengths, when used as ordinates uniformly spaced, have their extremities falling on a curve formed of two equal paraboli, one inverted with respect to the other, the end ordinates corresponding respectively to the major and minor axes of the pitch line curve, and the centrally located ordinate having a length corresponding to the mean between the end ordinates, the extremity of said centrally located ordinate falling on that point where the paraboli meet, and the sums of the lengths of those ordinates that are equally spaced from the end ordinates being a constant and equal to the sum of the major and minor axes.

3. In a liquid transmission device, a casing having an inlet passage and an outlet passage, a pair of similar bilobar rotors within the casing, each rotor having mutually perpendicular major and minor axes, means for rotatably supporting said rotors respectively about the respective axes of symmetry, said axes being parallel to each other, and the rotors having teeth in intermeshing driving relation, and a pair of intermeshing bilobar gears for driving one of said rotors, each of said gears having mutually perpendicular major and minor axes, and rotatable about their axes of symmetry.

4. In a liquid transmission device, a casing having an inlet passage and an outlet passage, a pair of similar bilobar rotors within the casing, each rotor having mutually perpendicular major and minor axes, means for rotatably supporting said rotors respectively about the respective axes of symmetry, said axes being parallel to each other, and the rotors having teeth in intermeshing driving relation, a bilobar gear having mutually perpendicular major and minor axes, and mounted coaxially with one of said rotors and on the axis of symmetry of the gear, said gear being arranged to drive said one of said rotors, the major axis of the gear being angularly coincident with the major axis of said one of said rotors, and another gear similar to said first mentioned gear and in driving relation thereto.

5. In a liquid transmission device, a casing having an inlet passage and an outlet passage, a pair of similar bilobar rotors within the casing, each rotor having mutually perpendicular major and minor axes, means for rotatably supporting said rotors respectively about the respective axes of symmetry, said axes being parallel to each other, and the rotors having teeth in intermeshing driving relation, a bilobar gear having mutually perpendicular major and minor axes, and mounted coaxially with one of said rotors and on the axis of symmetry of the gear, said gear being arranged to drive said one of said rotors, the major axis of the gear being angularly coincident with the major axis of said one of said rotors, and another gear similar to said first mentioned gear and in driving relation thereto, the ratio of the major axis to the minor axis of each of said gears being less than the ratio of the major axis to the minor axis of a rotor.

6. In a liquid transmission device, a casing having an inlet passage and an outlet passage, a pair of similar bilobar rotors in said casing, each rotor having mutually perpendicular major and minor axes, means for rotatably supporting said rotors respectively about the respective axes of symmetry, said axes being parallel to each other, and the rotors having teeth in intermeshing driving relation, a bilobar gear having mutually perpendicular major and minor axes, and mounted coaxially with one of said rotors and on the axis of symmetry of the gear, said gear being arranged to drive said one of said rotors, the major axis of the gear being angularly coincident with the major axis of said one of said rotors, and another gear similar to said first mentioned gear and in driving relation thereto, the ratio of the major axis to the minor axis of each of said gears being $\sqrt{N}$, where N is the ratio of the major axis to the minor axis of a rotor.

FRANCIS W. GUIBERT.
FREDERIC B. FULLER.